W. L. JONES.
COMPRESSED AIR AND SUCTION WATER ELEVATOR.
APPLICATION FILED MAY 15, 1914.
1,135,023.
Patented Apr. 13, 1915.
2 SHEETS—SHEET 1.
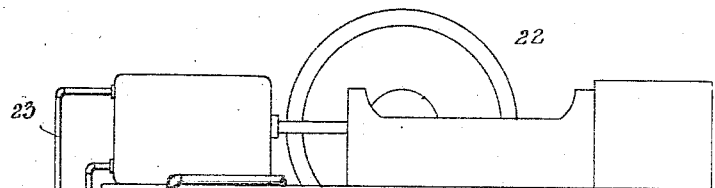
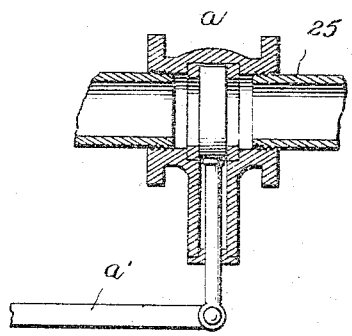
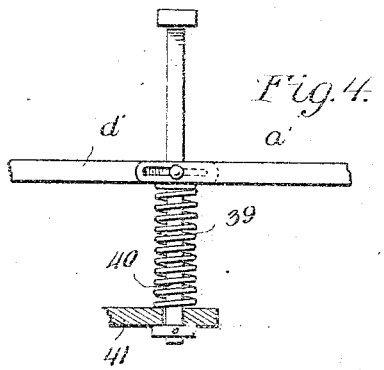

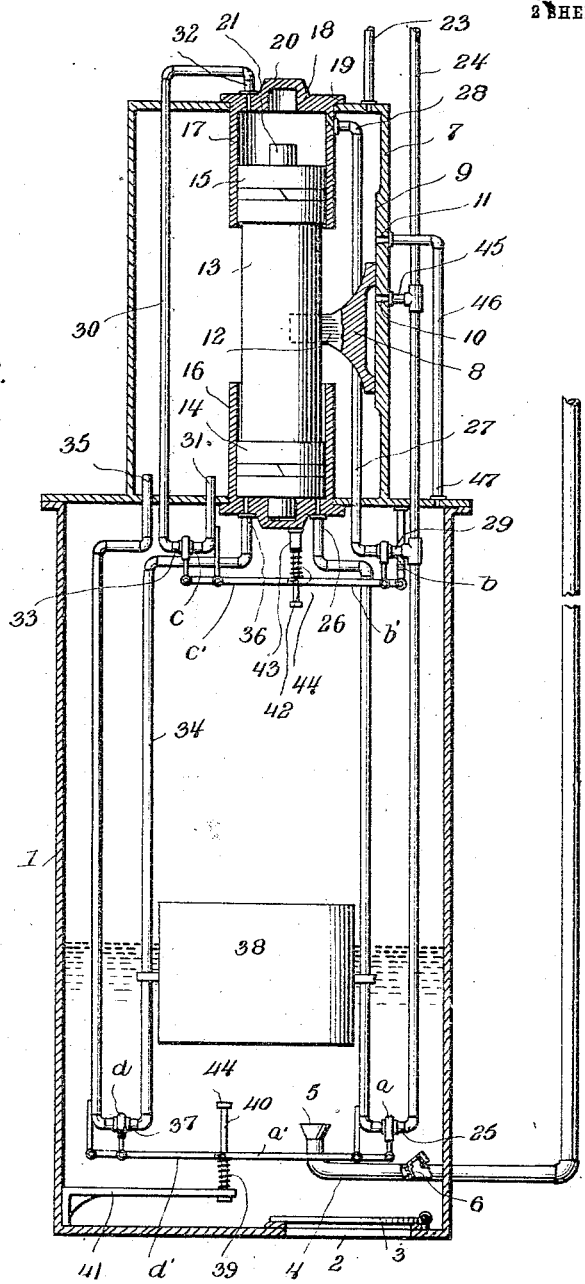

UNITED STATES PATENT OFFICE.

WILL L. JONES, OF DOUGLAS, ARIZONA.

COMPRESSED-AIR AND SUCTION WATER-ELEVATOR.

1,135,023.

Specification of Letters Patent.

Patented Apr. 13, 1915.

Application filed May 15, 1914. Serial No. 838,845.

*To all whom it may concern:*

Be it known that I, WILL L. JONES, a citizen of the United States, residing at Douglas, in the county of Cochise and State of Arizona, have invented new and useful Improvements in Compressed-Air and Suction Water-Elevators, of which the following is a specification.

This invention relates to water elevators, the object in view being to provide a machine of the class described which will operate automatically when submerged in water and connected by outgoing and return pipes with an air compressor.

The invention relates particularly to the valve mechanism for controlling the pressure and suction pipes leading between the water chamber of the elevator and the air compressor, whereby a master valve is automatically shifted back and forth to furnish alternate pressure and suction in the water chamber thereby insuring the filling of said chamber with water and the forcing of the water therefrom, the action of the master valve being controlled by means of a buoyant float movable up and down in the water chamber.

With the above and other objects in view, the invention consists in the novel construction, combination and arrangement of parts, as will be hereinafter more fully described, illustrated and claimed.

In the accompanying drawings:—Figure 1 is a side elevation of the complete apparatus of this invention. Fig. 2 is an enlarged vertical sectional view of the water chamber, valve chamber and connections. Fig. 3 is a detail sectional view on an enlarged scale of one of the small controlling valves. Fig. 4 is a fragmentary detail elevation partly in section illustrating the lever operating means.

Referring to the drawings 1 designates a water receiving tank or chamber adapted to be submerged in a body of water, said chamber being closed on all sides, as well as top and bottom with the exception of a water intake opening 2 preferably shown in the bottom thereof and controlled by a foot valve 3 which opens and closes automatically under the action of the air pressure or suction in the water chamber as will hereinafter appear.

4 designates the water discharge pipe the receiving end 5 of which is arranged near the bottom of the water chamber 1, said pipe being equipped with a check valve 6 and extending outwardly through one side of the water chamber and upwardly and off to the service point.

Mounted on the top of the water chamber 1 is a combined air and valve chest 7 which is air-tight and in which is arranged a master valve 8 of the slide type as shown in Fig. 2, said master valve sliding back and forth in contact with a valve seat 9 formed with a suction port 10 and a pressure port 11. The valve 8 is provided with an arm 12 having a loose jointed connection with a reciprocatory piston 13 which actuates said master valve. This piston 13 is provided with two piston heads 14 and 15 which operate in the end sections 16 and 17 of a cylinder, said cylinder sections being contained within the air chest 7.

In the preferred embodiment of this invention each cylinder section 16 and 17 is formed integrally with a cylinder head 18 flanged as shown at 19 and bolted or otherwise firmly secured to the adjacent end wall of the air chest 7. Each cylinder head is also provided with a dash pot 20 to receive a piston-like extension 21 on the adjacent end of the piston head as shown in Fig. 2. This cushions the strokes of the double headed piston 13, causing the same to act quietly.

22 designates an air compressor which is conventionally shown, and which may be of any preferred type, and 23, a pressure pipe leading therefrom into the air chest 7.

24 designates a suction pipe communicating with the opposite end of the air compressor, said suction pipe extending along the outside of the air chest 7 and lengthwise through the water chamber 1, being formed near the bottom of said chamber with a horizontal run 25, the pipe 24 then extending again upwardly and terminating at 26 in the cylinder section 16. The pipe 24 is also formed with a branch 27 which terminates at 28 in the other cylinder section 17, said branch being provided with a horizontal run 29 near the top of the water chamber and inside of the same.

30 designates a pressure pipe the receiving end 31 of which is within the air chest 7 and the discharge end 32 of which enters the cylinder section 17. This pressure pipe 30 is provided with a horizontal run 33 about on the same level with the run 29 above referred to. Another pressure pipe 34 has its receiving end 35 arranged in the air chest 7, and its discharge end 36 in the cylinder section 16. The pipe 34 extends downwardly to a point near the bottom of the water chamber 1 where it is provided with a horizontal run 37. The runs 25, 29, 33 and 37 are respectively controlled by valves $a$, $b$, $c$ and $d$ and the said valves are provided with operating levers $a'$, $b'$, $c'$ and $d'$ arranged as shown in Fig. 2 near the top and bottom of the water chamber so as to be acted upon by a float or buoyant element 38. The levers $a'$ and $d'$ are supported by a coiled spring 39 surrounding a plunger stem 40 guided by a bracket and spring support 41 within the bottom of the water chamber. The levers $b'$ and $c'$ are likewise supported in a certain position by means of a spring 42 surrounding a plunger stem working in a guide 43 at the upper end of the water chamber 1. Each plunger stem has a head 44 against which the float 38 is adapted to strike as it reaches the upper or lower limit of its movement, said plunger in turn operating against the adjacent levers to open the valve $c$ and close the valve $b$ of the upper set and to open the valve $d$ and close the valve $a$ of the lower set, the levers controlling said valves being fulcrumed as shown to produce the operation described.

The suction pipe 24 is provided with a branch 45 which leads into the suction port 10 above referred to and from the pressure port 11 of the master valve a combined pressure and suction pipe 46 leads into the upper part of the water chamber 1, terminating at the point 47.

From the foregoing description taken in connection with the accompanying drawings the operation of the water elevator will now be understood. When the water chamber 1 is filled, the valves $c$ and $b$ are tripped by means of the float 38 so as to force the piston 13 downwardly and carry the master valve 8 to the position shown in Fig. 2. This opens the pressure port 11 and compressed air is forced through the pipe 46 into the top of the water chamber, pressing the water outwardly through the discharge pipe 4. When the water chamber 1 is nearly empty, the float 38 trips the valves $a$ and $d$ allowing the compressed air to pass into the lower cylinder section 16, the piston 13 being thereupon shifted upwardly so as to cause the valve 8 to bridge the ports 10 and 11. This produces a suction in the water chamber 1 through the pipe 46, thereby opening the foot valve 3 and permitting the water to enter and refill the chamber 1. This operation continues indefinitely as long as there is a supply of water and as long as the air compressor is in operation, the float serving to trip the small controlling valves by means of which the master valve is operated in the manner and for the purpose above stated. In case of the water supply running short, no air will be wasted as the automatic part of the mechanism will be thrown out of operation. If there is an ample supply of water, then the elevator will operate under full head pressure on one end of the valve piston and partial vacuum or suction pressure on the other end to throw the valve in working position.

What I claim is:—

1. In a water elevator, a submerged water receiving and delivery chamber, a water inlet check valve for said chamber, an air compressor, air pressure and suction pipes connected with said air compressor, a slide valve controlling said pipes, a reciprocatory piston for actuating said valve, a cylinder in which said piston works and having its opposite ends in communication with said pipes, a float in said water chamber, and float operated valves controlling said pipes and arranged at the top and bottom of said water chamber.

2. In a water elevator, a submerged water receiving and delivery chamber, a water inlet check valve for said chamber, an air compressor, air pressure and suction pipes connected with said air compressor, a master valve controlling said pipes, a cylinder and piston for operating said master valve and having said pipes in communication therewith, a float in said water chamber, and float operated valves controlling said pipes and arranged within and adjacent to the top and bottom of said water chamber.

In testimony whereof I affix my signature in presence of two witnesses.

WILL L. JONES.

Witnesses:
 FRANK BAUER,
 W. E. SCHWAMM.